United States Patent [19]
Huber et al.

[11] 4,171,143
[45] Oct. 16, 1979

[54] BUMPER FOR A MOTOR VEHICLE

[75] Inventors: Guntram Huber, Aidlingen; Hubert Hutai, Grafenau; Wolfgang Klie, Korntal; Wolfgang Fischer, Echterdingen; Reinhold Heim, Böblingen; Wolfgang Labatze, Sindelfingen, all of Fed. Rep. of Germany

[73] Assignee: Daimler-Benz AG, Fed. Rep. of Germany

[21] Appl. No.: 841,933

[22] Filed: Oct. 13, 1977

[30] Foreign Application Priority Data
Oct. 30, 1976 [DE] Fed. Rep. of Germany ....... 2650009

[51] Int. Cl.² ............................................. B60R 19/02
[52] U.S. Cl. .................................... 293/121; 293/120
[58] Field of Search .................. 293/71 R, 98, 75, 70, 293/96, 99, 100

[56] References Cited
U.S. PATENT DOCUMENTS
3,606,434 9/1971 Barton et al. ................. 293/71 R X
3,841,679 10/1974 Muller ............................ 293/71 R X FOREIGN PATENT DOCUMENTS
2460859 6/1976 Fed. Rep. of Germany.

Primary Examiner—Douglas C. Butler
Attorney, Agent, or Firm—Craig and Antonelli

[57] ABSTRACT

A bumper for a motor vehicle having a support member that extends over the vehicle width and is supported at fixed vehicle parts; a preferably surface-finished cover is provided in the upper area of the support member which is adjoined by a covering member that covers off at least the remaining visible area of the support member; the cover is thereby drawn forwardly up to the end face of the support member and its end-face end area is supported at the support member and is covered off by the covering member.

29 Claims, 5 Drawing Figures

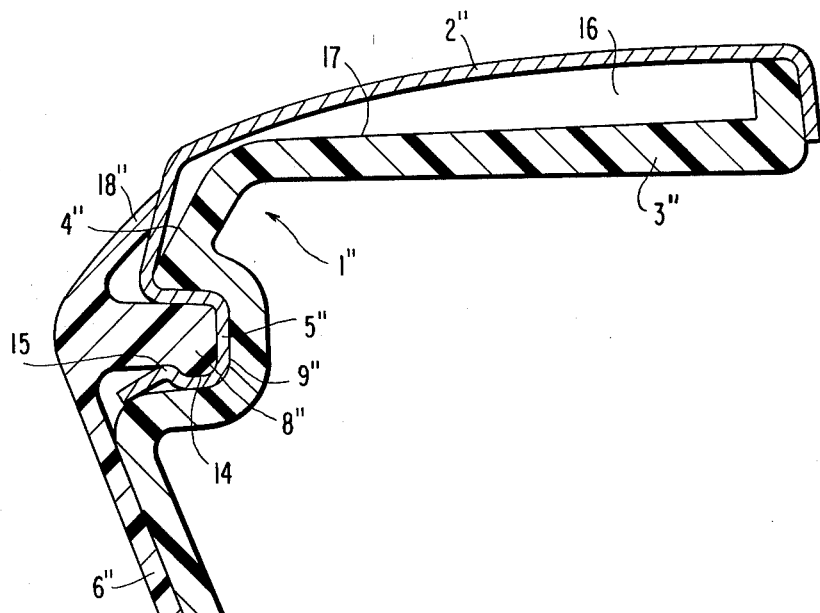
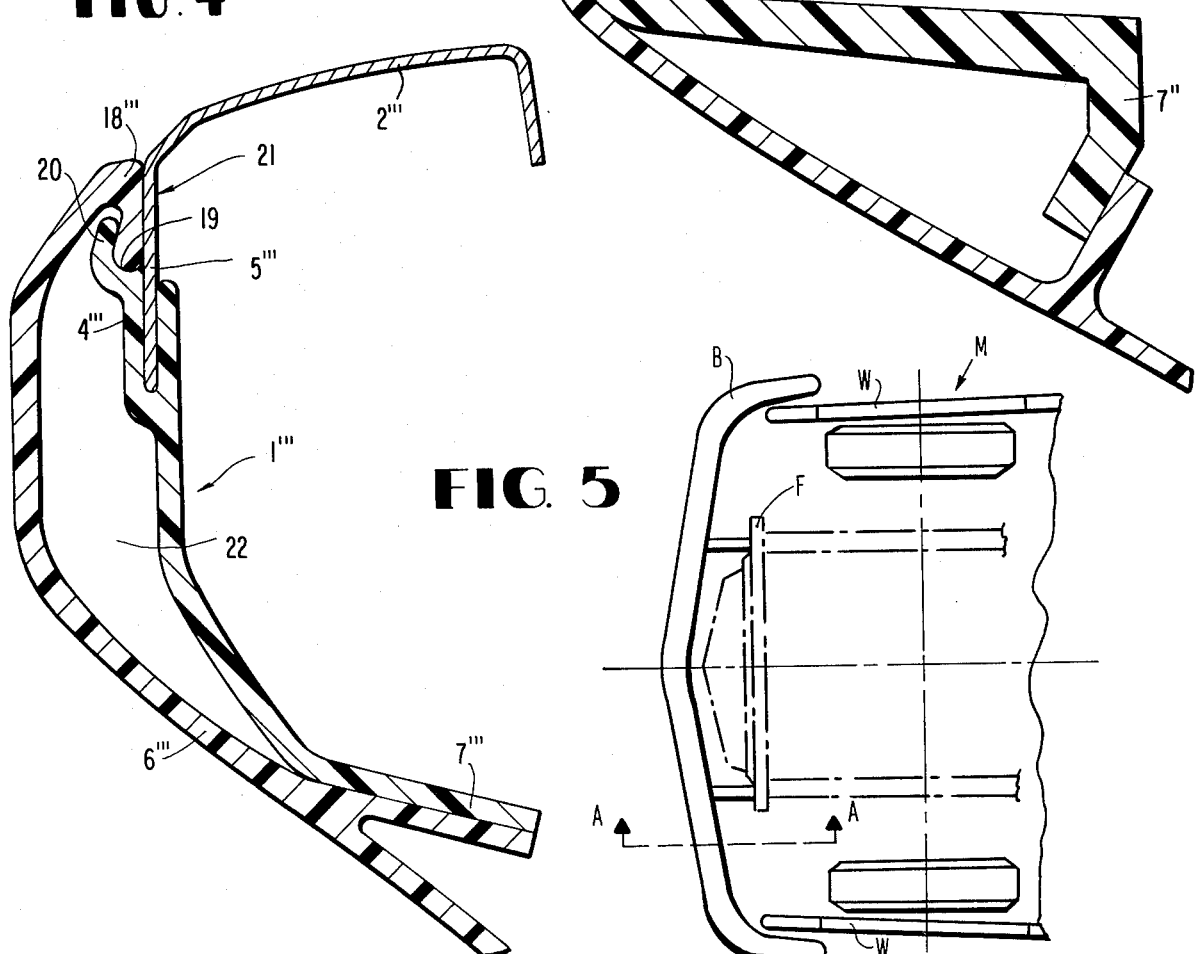
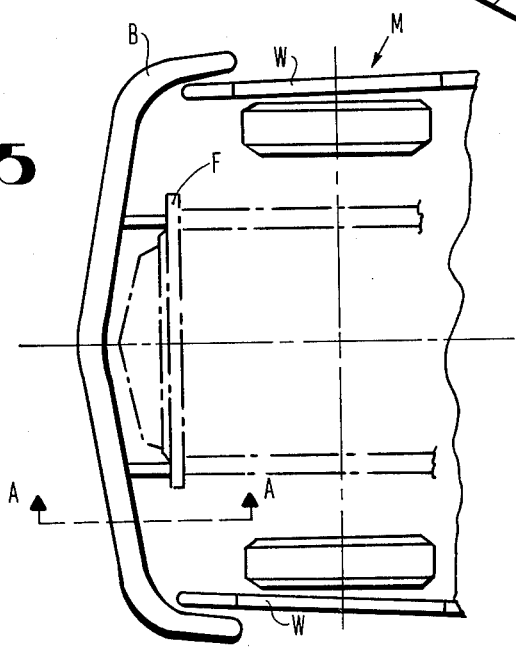

BUMPER FOR A MOTOR VEHICLE

The present invention relates to a bumper for a motor vehicle, consisting of a support body extending over the vehicle width and supported at fixed vehicle parts, which receives in its upper area a preferably surface-finished cover that is adjoined by a covering member consisting of elastic synthetic material which covers off at least the remaining visible area of the support body.

Such a bumper is disclosed in the German Offenlegungsschrift No. 2,460,859. The upper flange of the support body profile thereby includes a groove for the simultaneous mounting of the cover and of the covering member. In order not to weaken the support body within this fastening section, a relatively strong material accumulation is necessary requiring additional unwanted weight.

It is the aim of the present invention to provide a type of connection for the cover and covering member, on the one hand, and for the support body, on the other hand, which is able to get along without weight increase of the support body and by means of which additionally an improved appearance of the transition of cover and covering member is attained.

Consequently, it is proposed with a bumper of the aforementioned type to draw the cover forwardly according to the present invention, up to the end face of the support body, whereby its end-face end area is supported at the support body and is covered by the covering member.

The cover may thereby project from the support member self-supportingly, which support member also has supporting functions, and the covering member can be clampingly received and mounted in a groove formed by a drawn-up or extended wall of the support body and by a wall of the covering member.

A uniform abutment and support of the cover can be attained when the same rests on support ribs which project from the outside of the support body.

In a preferred embodiment of the present invention, the covering member projects with an inwardly disposed web into a recess of the support body. The recess can be constructed, for example, as continuous groove or also as locally recurring aperture.

A simple connection can be created in that a fastening means projecting from the web of the cover serves for the simultaneous fixing of the covering member at the support body. These fastening means arranged at a distance from one another may consist of clips.

However, it is also possible to construct the web of the covering member hook-shaped and to press the same into the recess from the free end of the cover during the fastening thereof.

It is also advantageous if the web of the covering member is provided with a projection which engages with prestress from behind a coordinated shoulder of the cover during the pressing-in into the recess.

A pleasing appearance and an easy maintenance of cleanliness can be attained when the upper free end of the covering member terminates lip-shaped and is supported at the cover.

In another embodiment of the present invention, an improved pedestrian protection and an avoidance of minor damages is achieved if the covering member is held at a distance from the support body under interposition of elastically deformable intermediate members such as chambers and webs.

According to another feature of the present invention, it is advantageous if the cover and covering member extend mutually supporting each other beyond the end areas of the support body and are drawn about the vehicle corners.

A lateral protection can also be attained in that adjoining the end areas of the support body, the covering member drawn about the vehicle corners projects self-supportingly.

The cover and/or the covering member is thereby intended to terminate appropriately at the wheel cutouts.

Accordingly, it is an object of the present invention to provide a bumper for a motor vehicle which avoids by simple means the aforementioned shortcomings and drawbacks encountered in the prior art.

Another object of the present invention resides in a bumper for a motor vehicle which is relatively strong, yet does not require excessive material accumulations that might increase its weight.

A still further object of the present invention resides in a bumper for a motor vehicle which is of relatively light-weight construction, yet provides a simple and highly effective connection for the various parts thereof.

Still another object of the present invention resides in a bumper which excels by particularly pleasing external appearance.

A further object of the present invention resides in a bumper, in which a simple connection can be used for the various parts thereof.

Still a further object of the present invention resides in a bumper of the type described above which not only assures a pleasing appearance but has such a construction that it can easily be kept clean.

A further object of the present invention resides in a bumper for motor vehicles which improves the protection for pedestrians.

These and other objects, features and advantages of the present invention will become more apparent from the following description when taken in connection with the accompanying drawing which shows, for purposes of illustration only, several embodiments in accordance with the present invention, and wherein:

FIG. 3 is a cross-sectional view through a still further modified embodiment of a bumper in accordance with the present invention for a motor vehicle;

FIG. 4 is a cross-sectional view through still another embodiment of a bumper in accordance with the present invention in which the cover fulfills a supporting function; and FIG. 5 is a partial bottom view of a vehicle schematically depicting the disposition of a bumper in accordance with the present invention thereon.

FIG. 5 schematically depicts a motor vehicle M having wheel cutouts W and fixed support parts F. Bumper assembly B is carried at the fixed parts F. FIGS. 1 to 4 show various embodiments of the bumper assembly B, taken along section A—A of FIG. 5.

Figure 1:
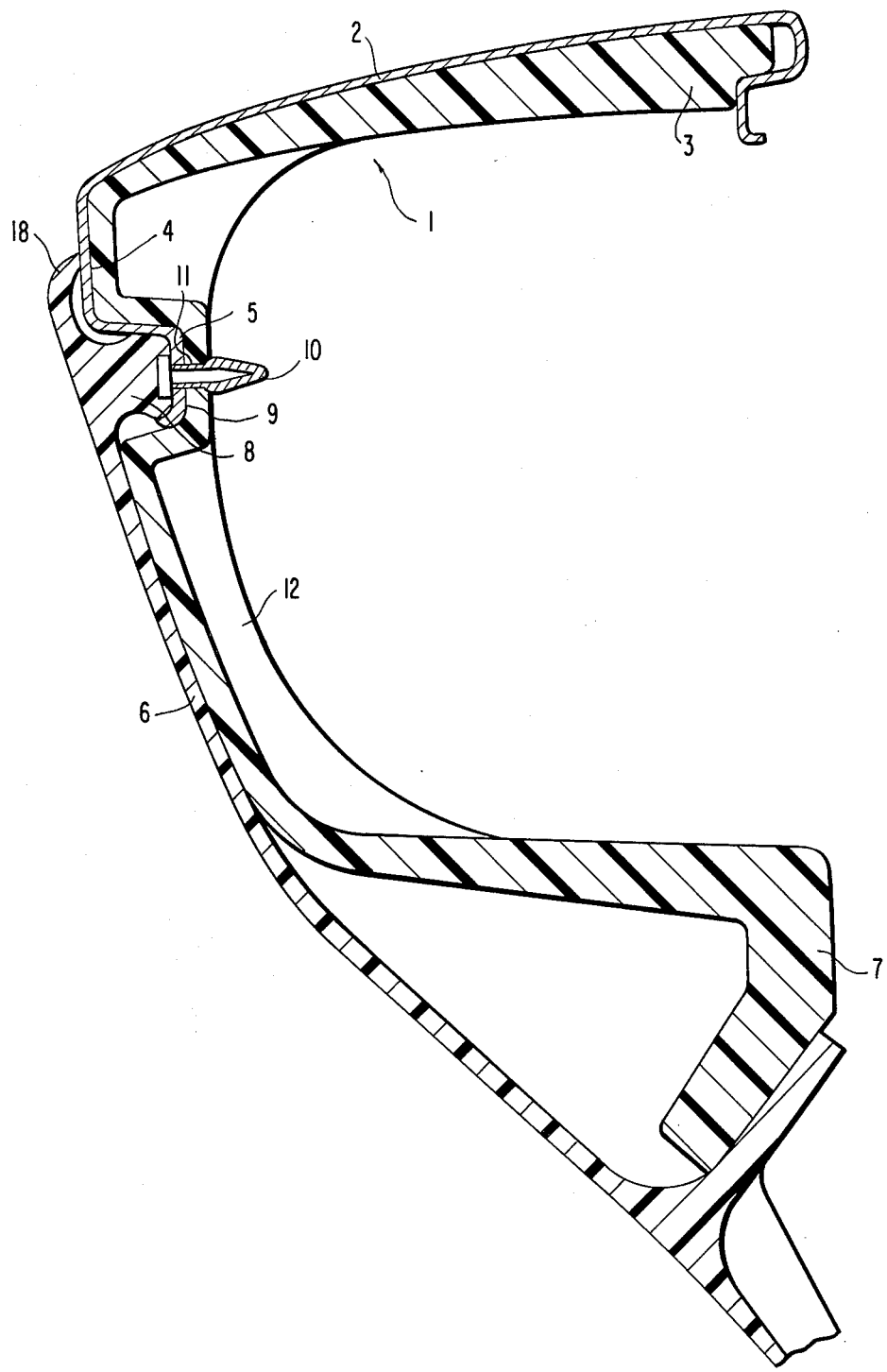
FIG. 1 is a cross-sectional view through a first embodiment of a bumper in accordance with the present invention.
Figure 2:
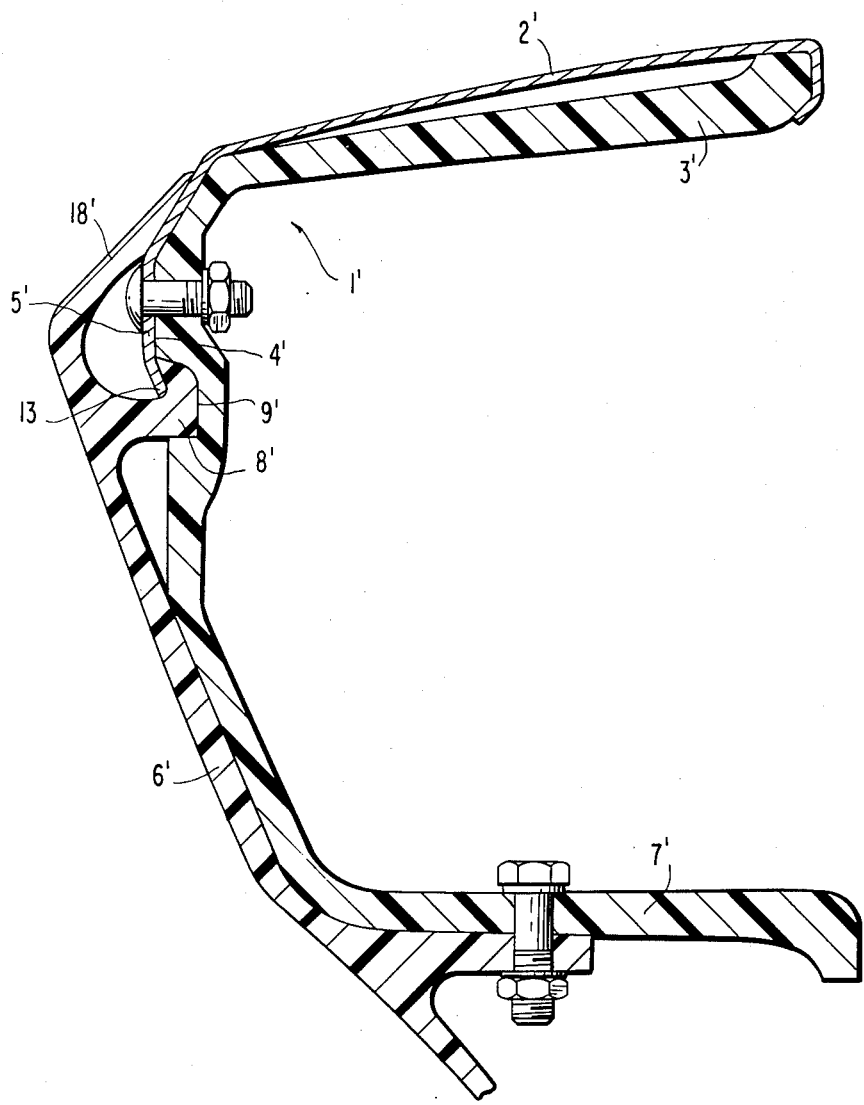
FIG. 2 is a cross-sectional view through a modified embodiment of a bumper in accordance with the present invention, utilizing a different fastening of its cover and covering member at the support member.

Referring now to FIGS. 1 to 4 wherein like reference numerals are used throughout the various views to designate like parts, with primed and multiply primed numerals depicting modified arrangements the upper area of a support body or support member generally designated by reference numeral 1, which may consist, for example, of an aluminum extrusion profile, of a steel plate profile, or of a glass fiber-reinforced synthetic resinous profile, includes a preferably surface-finished metallic cover 2 which, according to FIGS. 1 to 3, is fastened near the upper end thereof at the upper leg 3 of the support member 1 by a clamping, threaded or riveted connection and is drawn forwardly up to the end face 4 of the support member 1. The end-face end area 5 of the cover 2 is overlapped and covered off by a covering member 6 which shields at least the remaining area of the support member 1, but which may also be further drawn downwardly in the form of an apron.

Whereas the covering member 6 may be secured at the lower leg 7 of the support member 1, for example, by means of bolts or screws (not shown), it is pressed within the end-face area of the support member 1 against the cover 2 supported at the support member 1 by a clamping connection. The covering member 6 thereby projects according to FIGS. 1 to 3 with an inwardly disposed web 8 into a recess 9 of the support member 1 which serves simultaneously as reinforcement.

In the embodiment according to FIG. 1, a fastening means 10, for example, a formed-in fastening means 10 in the form of a clip projects from the web 8 at certain distances, which engages into a coordinated opening 11 in the cover 2 and at the bottom of the recess 9 constructed as a groove. For purposes of reinforcing the support member 1, the latter is provided with webs 12 arranged on the inside thereof.

According to FIG. 2, the web 8' is constructed hook-shaped and is pressed into the recess 9' by the free end 13 of the cover 2' during the fastening thereof.

In contradistinction thereto, in the embodiment according to FIG. 3, the web 8" of the covering member 6" is provided with a projection 14, whereby during the pressing-in into the recess 9", a coordinated shoulder 15 of the cover 2" is engaged from behind with prestress. Furthermore, the cover 2" rests on support ribs 16 which project from the outside 17 of the support member 1".

Whereas according to FIGS. 1 to 3, the upper free end 18 of the covering member, 6', 6" terminates lip-shaped and is supported at the cover 2', 2", in the embodiment according to FIG. 4, the covering member 6'" extends angularly bent-off and is clampingly received by a groove 19 which is formed by a drawn-up wall 20 of the support member 1'" and by a wall 21 of the cover 2'". For purposes of an improved pedestrian protection, and for purposes of avoiding minor damages, the covering member 6'" is retained at a distance from the support member 1'" by interposition of elastically deformable intermediate members 22 in the form of one or several chambers, for example, foamed-out chambers.

For purposes of achieving a lateral protection, the cover 2 and/or the covering member 6 may be drawn about the vehicle corners in a manner only very schematically indicated in FIG. 5 adjoining the end areas of the support member 1 and may terminate, for example, at the wheel cutouts W. If, in such a case, the cover 2 and the covering member 6 are extended, then one may utilize a connection of these two parts as shown in FIG. 3.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A bumper for a motor vehicle or the like which exhibits a vehicle width in a direction transverse to the vehicle travel direction, comprising:

support means extending substantially across the vehicle width and supported at fixed vehicle parts, said support means exhibiting an outwardly facing end face which faces away from the fixed vehicle parts, a decorative cover extending over an upper surface of said support means, said cover extending to and downwardly over only an upper portion of said end face, said cover terminating in the downward direction at a position spaced from the bottom of said support means, covering means adjoining the cover and covering the area of said end face below said cover, and fastening means for fastening the cover and covering means to said support means, said covering means and cover being configured to completely cover said fastening means and said end face of the support means so that only said covering means and cover are visible in the direction facing said end face.

2. A bumper according to claim 1, characterized in that the cover is surface-finished.

3. A bumper according to claim 2, characterized in that the cover and the covering means extend mutually supporting beyond the end areas of the support means and are drawn about vehicle corners of the vehicle.

4. A bumper according to claim 3, characterized in that, adjoining the end areas of the support means, the covering means drawn about the vehicle corners projects self-supportingly.

5. A bumper according to claim 4, characterized in that at least one of the cover and covering means terminates at wheel cutouts of the motor vehicle.

6. A bumper according to claim 5, characterized in that both the cover and the covering means terminate at the wheel cutouts.

7. A bumper according to claim 1, characterized in that the cover projects self-supportingly from the support means, and in that the covering means is clampingly mounted in a groove formed by a wall of the support means and by a wall of the cover.

8. A bumper according to claim 7, characterized in that said wall of the support means extends generally upwardly.

9. A bumper according to claim 8, characterized in that the covering means is kept at a distance from the support means under interposition of elastically deformable intermediate means.

10. A bumper according to claim 9, characterized in that the intermediate means are chamber means.

11. A bumper according to claim 10, characterized in that the chamber means are foamed out.

12. A bumper according to claim 11, characterized in that the intermediate means are formed by a chamber means and webs.

13. A bumper according to claim 1, characterized in that the cover rests on support ribs that project from the outside of the support means.

14. A bumper according to claim 1, characterized in that the covering means projects with an inwardly disposed web into a recess provided in the support means.

15. A bumper according to claim 14, characterized in that a fastening means projecting from the web of the covering means serves for the simultaneous fastening of the cover at the support means.

16. A bumper according to claim 14, characterized in that the covering means is constructed hook-shaped and is pressed into the recess by a free end of the cover during the fastening thereof.

17. A bumper according to claim 14, characterized in that the web of the covering means is provided with a projection which during the pressing-in into the recess engages from behind with prestress a shoulder coordinated thereto of the cover.

18. A bumper according to claim 14, characterized in that the cover rests on support ribs that project from the outside of the support means.

19. A bumper according to claim 18, characterized in that the upper free end of the covering means terminates lip-shaped and is supported at the cover.

20. A bumper according to claim 1, characterized in that the upper free end of the covering means terminates lip-shaped and is supported at the cover.

21. A bumper according to claim 1, characterized in that the covering means is kept at a distance from the support means under interposition of elastically deformable intermediate means.

22. A bumper according to claim 21, characterized in that the intermediate means are chamber means.

23. A bumper according to claim 22, characterized in that the chamber means are foamed out.

24. A bumper according to claim 22, characterized in that the intermediate means are formed by a chamber means and webs.

25. A bumper according to claim 1, characterized in that the cover and the covering means extend mutually supporting beyond the end areas of the support means and are drawn about vehicle corners of the vehicle.

26. A bumper according to claim 25, characterized in that at least one of the cover and covering means terminates at wheel cutouts of the motor vehicle.

27. A bumper according to claim 26, characterized in that both the cover and the covering means terminate at the wheel cutouts.

28. A bumper according to claim 26, characterized in that, adjoining the end areas of the support means, the covering means drawn about the vehicle corners projects self-supportingly.

29. A bumper according to claim 1, characterized in that, adjoining the end areas of the support means, the covering means drawn about the vehicle corners projects self-supportingly.

* * * * *